United States Patent
Garrison

(10) Patent No.: US 9,384,508 B2
(45) Date of Patent: Jul. 5, 2016

(54) SYSTEMS, METHODS, AND APPARATUS FOR WIRELESS THERMAL PRINTING FOR ORDER FULFILLMENT

(71) Applicant: Wesley S. Garrison, Chapel Hill, NC (US)

(72) Inventor: Wesley S. Garrison, Chapel Hill, NC (US)

(73) Assignee: CHIT YES, LLC, Chapel Hill, NC (US)

( * ) Notice: Subject to any disclaimer, the term of this patent is extended or adjusted under 35 U.S.C. 154(b) by 75 days.

(21) Appl. No.: 13/958,572

(22) Filed: Aug. 4, 2013

(65) Prior Publication Data

US 2015/0039476 A1 Feb. 5, 2015

(51) Int. Cl.
*G06Q 30/06* (2012.01)
*G06K 15/00* (2006.01)
*G06K 15/02* (2006.01)

(52) U.S. Cl.
CPC .......... *G06Q 30/0635* (2013.01); *G06K 15/005* (2013.01); *G06K 15/022* (2013.01); *G06K 15/028* (2013.01)

(58) Field of Classification Search
CPC ... G06Q 30/00; G06F 312/00; H04N 1/00204
See application file for complete search history.

(56) References Cited

U.S. PATENT DOCUMENTS

| | | | |
|---|---|---|---|
| 8,200,550 B2 | 6/2012 | Aitkins | |
| 9,031,867 B1* | 5/2015 | Crawford | G06Q 30/0601 705/15 |
| 2004/0035643 A1* | 2/2004 | Dev et al. | 186/36 |
| 2005/0060250 A1 | 3/2005 | Hapamas et al. | |
| 2008/0262972 A1* | 10/2008 | Blake | G06Q 20/401 705/75 |
| 2009/0287550 A1* | 11/2009 | Jennings | 705/11 |
| 2011/0184822 A1* | 7/2011 | Matkovic | G06Q 20/202 705/18 |
| 2013/0030955 A1* | 1/2013 | David | 705/26.8 |
| 2013/0211939 A1* | 8/2013 | Katira | G06Q 30/0641 705/26.1 |

FOREIGN PATENT DOCUMENTS

| | | | | |
|---|---|---|---|---|
| GB | 2472018 A | 1/2011 | | |
| WO | 2006133713 A2 | 12/2006 | | |
| WO | 2008046613 A1 | 4/2008 | | |
| WO | 2008004241 A3 | 5/2009 | | |
| WO | WO 2010/037394 A1 * | 4/2010 | | G06Q 30/00 |
| WO | WO2011149533 | * | 12/2011 | G01R 31/08 |

OTHER PUBLICATIONS

Restaurants get creative with QR codes. Retrieved from http://www.restaurantbusinessonline.com/operations/technology/restaurants-get-creative-qr-codes.*

* cited by examiner

*Primary Examiner* — Kathleen Palavecino
*Assistant Examiner* — Abby Flynn
(74) *Attorney, Agent, or Firm* — Triangle Patents, PLLC

(57) ABSTRACT

Systems, methods, and a printer apparatus using network-based communication over 3G or 4G wireless networks, and provides for electronic response from the printer relating to order confirmation and fulfillment at the recipient printer, in communication to an order management coordinator or server. The printer provides an order output including at least one symbol representing an order, including at least one of order content, ordering entity or individual, price, time of order, and combinations thereof.

10 Claims, 9 Drawing Sheets

| Qty | Item name | Each |
|---|---|---|
| | ACP - Arroz Con Pollo (small) | $ 8.95 |
| | - Lettuce, tomato, and sour cream $ 0.00 | |
| | ACP - Arroz Con Pollo (small) | $ 8.95 |
| | - Refried Beans $ 0.00 | |
| | Acupolco Taco Salad | $ 9.95 |
| | - Chicken $ 0.00 | |

Items: $27.85
Tax: $ 2.09
Total: $29.94

← 80

SYSTEMS, METHODS, AND APPARATUS FOR WIRELESS THERMAL PRINTING FOR ORDER FULFILLMENT

BACKGROUND OF THE INVENTION

1. Field of the Invention

The present invention relates to distributed order fulfillment systems and methods, including a wireless printer device for network-based communications relating to orders for goods and/or services and the management and fulfillment of those orders.

2. Description of the Prior Art

Generally, it is known in the relevant art to provide remote ordering systems and methods to allow customers to place an order for items, such as restaurant food, by sending a text message or SMS message from a mobile phone or by placing an order through a website, located remotely from the provider of the items. It is also known in the art to use thermal printing for order processing and fulfillment for restaurants. By way of background, thermal printing provides digital printing without ink; the methods include selectively heating coated thermochromic paper or thermal paper to produce a printed image without ink when the paper passes over a thermal print head, which transforms the selectively heated spots black, thereby producing a printed image or text on the paper.

More specifically, it is known in the prior art to use wireless thermal printers for receiving text messages or short message service (SMS) messages for printing orders based upon the message. However, the recipient printer apparatus does not provide for communication over 3G or 4G wireless networks, and does not allow for response relating to order confirmation and fulfillment at the recipient printer, in communication to an order management coordinator or server or to individual remote order placing individuals or entities.

Relevant prior art references are exemplified in the following documents:

UK Patent Application No. GB2472018, filed Jul. 21, 2009 (also related to GB Patent Application No. GB0912623.6) by Sujan, for "Ordering System," discloses an ordering system consisting of webpage(s) placing orders and two other devices process the order in a remote location such as a takeaway or a restaurant, wherein the invention sends the order by only sending encoded SMS messages to a printer device which is the first device receiving the order via the GSM network and then decodes the order with the embedded hardware and prints the order with all kinds of formation required. This order is then accepted or rejected by the device user and the status is sent back to the SMS sender via encoded SMS. The second device is a satellite navigator with barcode reader to read the order address from the printed barcode and set the destination of the navigation system automatically. The thermal printer device is sold commercially in the UK by iBacs Ltd./iBacsTel Remote Printers, and described on its company website as operable to receive and print orders in a remote location via the GSM network (SMS) so that when messages are directly received to this GSM printer it has the functionality to process the order and can reply back status messages, namely accept, reject, delete, and feed (and numerical keys are provided as the only other functional buttons on the device) to the designated server via SMS. The company website states that this printer has the following limitations: "at the simplest level it is possible to send one way message to the printer; at the most complicated it is possible to set expire times for message, require restaurants acknowledge receipt of message before they are printed, receive feedback from the restaurant relating to the message, e.g. a delivery time for an order, and remove message from the printer queue that have not yet been printed." Notably, this printer is used for direct communication via SMS with customers placing food orders (to-go, pickup or delivery). Also, this printer is limited in printout dimensions at 58 mm width.

U.S. Pat. No. 8,200,550, filed May 15, 2007 by Stephen Aitkins, for "Systems and methods for remote ordering," teaches systems and methods for remote ordering where there is a client that is configurable to accept orders; an information processing system, that is in communication with the client and configurable to receive orders from the client; a plurality of wireless modules in disparate physical locations that are in wireless communication with the information processing system and configurable to receive orders from the information processing system; and an order presentation client that is in communication with the wireless module and configurable to present the order. Furthermore, the information processing system is configurable to route the orders to a selected wireless module based on the order.

U.S. Patent Application Publication No. 20050060250, filed Sep. 17, 2003 by Haparnas et al., for "Billing and ordering system and method for services provided over communications networks," discloses a method for ordering a service over a communications network having the steps of selecting a first service to be provided from a first system to a second system, wherein the service is associated with a first code; a message comprising the first code and user identifying information is generated in response to selecting the first service. The message is forwarded to the first system from the second system.

WIPO Publication No. WO2006133713, filed Jun. 16, 2006 by Jesper et al., for "Ordering system with terminal unit using a wireless network," describes an ordering system for ordering services or goods comprising a plurality of client computers connected to a digital data network, the client computers comprising means for receiving input from a client concerning orders, a central server system comprising a first software program and being connected to a first database and to the digital data network, the first database comprising digital data representing information about services or goods, service providers or good providers, the first software program being configured for communication with the client computers through the digital data network for providing data from the first database to the client computers concerning offers for services or goods and for receiving digital data representing the orders for the services or goods, the first software program being programmed to transmit an order to a service provider or goods provider in dependence of the order from a client, at least one terminal unit at the site for the service provider or good provider, the terminal unit being configured for receiving orders from the first software program and having means for indicating the requested orders to the service or goods provider, a wireless digital data network for transmitting data between the first software program and the terminal unit through a non-dedicated wireless line.

WIPO Publication No. WO2008004241, filed Jul. 8, 2007 by Alon Scharz, for "A method and system for ordering and supplying goods and services via a cellular phone," describes a method and a system for ordering and supplying goods and services including the steps of an end user sending a coded SMS message using a specially created syntax from a cellular device to an intermediary computer, which is configured to identify the supplier of goods being ordered from the coded SMS message and route the received message to the identified supplier of goods. The coded SMS message may also include unique identifiers for identifying goods being ordered, menu or catalog identifier codes, identifiers to identify the method of payment and the method of delivery.

WIPO Publication No. WO2008046613, filed Oct. 18, 2007 by Wolfram Reiners, for "A method to take orders and to handle billing for third party services for mobile devices," describes a method for taking orders and handling billing for third party services is disclosed that comprises the steps of: under the control of an initiating digital device: creating and sending an order to a computerized operator system (A), the order being a formatted text message containing order information data; under the control of the computerized operator system (A): receiving the order, validating the formatted text message contained in the received order, creating a formatted text message confirming the order and sending the formatted text message to the initiating digital device or, in the case of invalid received data, returning an error message, under the control of a digital device of a merchant (B): receiving the formatted text message confirming the order; creating a formatted text message reconfirming the order and confirming that payment has been received, and sending the same back to the computerized operator system (A), wherein the computerized operator system (A) charges the merchant bank account on receipt of the formatted text message reconfirming the order.

However, the prior art references nowhere teach or provide the improved systems, methods, and apparatus of the present invention, as set forth in the detailed description of this specification.

SUMMARY OF THE INVENTION

The present invention relates to remote ordering of products and/or services wherein the order is placed by a mobile communications device, such as a mobile phone or smartphone or computer, in network-based communication with a recipient server computer, which in turn is in network-based communication with a wireless printer device capable of interactive communication to receive and send messages, and to print and to scan and/or receive digital symbolic representations of an order for products and/or services. The present invention systems, methods, and apparatus provide for remote order processing to fulfillment with automated transformation of the order to a digital representation of the order including at least one unique symbol used for transmitting and for communicating order fulfillment upon completion by a third party.

It is an object of this invention to provide systems and apparatus embodiments of the present invention that are operable and function to perform method steps for order processing, management, and fulfillment including the steps of: receiving at an order recipient server computer, at least one message including an order that was initiated and sent from a corresponding at least one remote mobile communications devices over a communications network; the order recipient server computer transforming the order into a digital representation of the order including at least one unique symbol and transmitting the order over the network to at least one order fulfillment printer device located at an order fulfillment entity; the order fulfillment printer device receiving the order and automatically and/or autonomously transforming the order to a printed order, including the digital representation of the order having the at least one unique symbol; and the order fulfillment printer device automatically producing a printout of the order. Also, the method steps may further include the step of the order fulfillment printer device automatically generating an audible and/or visual alert when the order is received. Additionally, after completion of the order fulfillment, the at least one unique symbol is scanned by the order fulfillment printer device and an order fulfillment message is automatically generated and sent to the order recipient server via the network.

These and other aspects and objects of the present invention will become apparent to those skilled in the art after a reading of the following description of the preferred embodiment when considered with the drawings, as they support the claimed invention.

DETAILED DESCRIPTION

Figure 1:
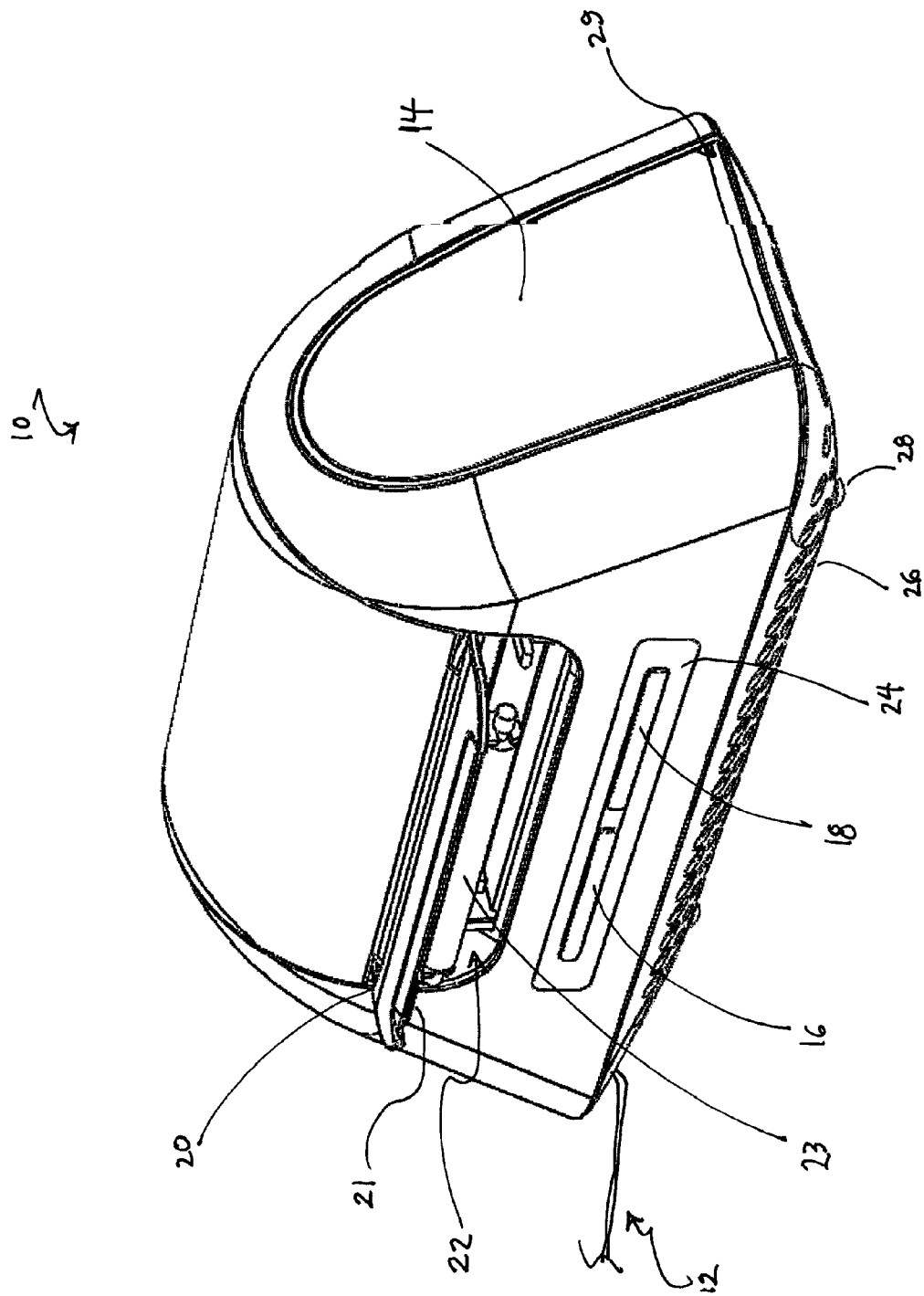
FIG. 1 is a schematic diagram showing a front perspective view of one embodiment of the apparatus of the invention.

The present invention systems, methods, and apparatus provide for remote order processing to fulfillment with automated transformation of the order to a digital representation of the order including at least one unique symbol used for transmitting and for communicating order fulfillment upon completion by a third party.

The present invention provides systems, methods, and a printer apparatus using network-based communication over 3G or 4G wireless networks, and provides for electronic response from the printer relating to order confirmation and fulfillment at the recipient printer, in communication to an order management coordinator or server or to individual remote order placing individuals or entities. The printer provides an order output including at least one symbol representing an order, including at least one of order content, ordering entity or individual, price, time of order, and combinations thereof. Furthermore, upon receipt of the order at the wireless order fulfillment printer device, at least one alarm notification is automatically activated at the order fulfillment device, including audio and/or visual alert to indicate that an order was received. Preferably, the order fulfillment printer device automatically and autonomously transforms the order into a digital representation of the order, i.e., at least one symbol is generated that is unique to each order and is automatically printed as a tangible manifestation of the order. In a preferred embodiment, the order is printed on thermal paper without ink. A user will selectively activate a confirmation button on the order fulfillment printer device, which automatically sends a confirmation of receipt message to the receiving server via the network. Then, the printed order is used by order fulfillment at that same location where the order fulfillment printer device is located for providing the products and/or services that are required by the order. When the order is completely fulfilled, the unique symbol, preferably a QR code, is scanned by the order fulfillment printer, which automatically and autonomously generates a notification message that is communicated via the network to the receiving server computer. Also, a "call" button for selective activation is provided for sending a notice to the receiving server that a question or issue about the order exists with order fulfillment.

In systems and methods of the present invention, a wireless thermal printer apparatus is used within a distributed communications network that further includes a multiplicity of remote communications devices or computers in network-based connection and/or communication with at least one server computer for sending and receiving electronic messages; the printer also is constructed and configured for sending and receiving electronic messages over the communications network, which preferably supports 3G and 4G wireless communications. The electronic (digital) wireless messages are initiated and sent from a plurality of remote mobile communications devices (for example as SMS or text messages) to a server computer, which transmits them to at least one thermal printer device located at an order fulfillment entity, the printer device being operable to receive messages via wireless network-based communication. The thermal printer device receives the message and automatically and/or autonomously transforms the message to a printed order, including a digital representation of the order having a symbol (e.g., bar code, QR code, etc.). The printer order may further include an order identification (ID), such as an ID number. Also, the digital representation of the order, including the symbol, corresponds to at least one of the following: a content of items in the order, a time of the order, a customer identifier, a customer location (address, GPS coordinates, etc.), items on the order, price of the order, method of payment or electronic payment confirmation, etc., and a fulfillment time of the order (when the order is requested to be fulfilled and/or received (delivered to the customer, if appropriate)).

Preferred embodiments of the present invention include a quick response (QR) code in the printed output of the order, as illustrated in the figures. It is known in the art to provide a QR code or matrix bar code, or 2D bar code, as an optically machine-readable label or symbol that is associated with a product or service or business, and information related to the product, service or business. The information encoded by a QR code comprises four standardized types or modes of data, which are numeric, alphanumeric, binary, Kanji, or through supported extensions or links, virtually any type of data. QR codes have fast readability and greater storage capacity than bar codes. Prior art applications for QR codes include product tracking, item identification, time tracking, document management, general marketing, automated linking or scan-to-website through mobile smartphone or device applications is also a known application of QR codes.

The present invention includes an order printout, as set forth hereinabove, wherein the order printout includes at least one symbol, and, more particularly, an unique symbol is provided for each order; the at least one unique symbol for each order being selected from the group consisting of a bar code, a QR code, any digital symbol capable of representing an order or a request, including an order identifier, and combinations thereof. Preferably, the symbol provides a digital representation of the order and/or an electronic link to a website or to a computer, server, processor coupled with memory, or other computer device, including but not limited to a smartphone, wherein detailed information regarding the order, the order content, order ID, customer ID, price, time of order, time of delivery requested, time of order fulfillment requested, and combinations thereof are provided or indicated. The symbol is optically scannable or readable by the printer device and/or a symbol reader or device coupled with, integrated with, and/or connected to the printer device, and equipped with software and hardware for receiving an image of the symbol and associating the symbol with the order and generating a signal or a message regarding the order fulfillment corresponding to that symbol. Preferably, the symbol is unique to each order and operable for identifying the order, the customer, the timing of the order placement, the timing of order completion or fulfillment, the price, order tracking in processing or status of the order, and combinations thereof.

The printer device provides a scan of the digital representation or symbol (QR code) upon fulfillment of the order, and transforms the scanned symbol into a message for confirmation of order fulfillment, and the message is transmitted over the network to the server computer of the order receiving entity. The order receiving entity server receives the message confirming order fulfillment and takes action relating to delivery, shipment, and/or notification of the end customer.

Hardware or firmware and/or software are operable on the printer device for receiving wireless messages and transforming them into the order printout including at least the digital representation of the order, including at least one symbol, preferably a QR code that is unique to each order; a chipset and board including a processor coupled with memory is provided, and the printer device is constructed and configured for optical scanning of the at least one symbol for automatically and/or autonomously generating an order fulfillment message and transmitting it or sending it via wireless network-based communication to the receiving entity server, which is remotely located from the printer device.

The present invention provides systems and methods for remote ordering where there is at least one customer who places an order on a corresponding at least one remote communication device for communicating an electronic message to a server computer that is part of an order processing and fulfillment system, which then transmits the message to a receiving entity device that is configurable to accept orders; preferably, the at least one remote communication device is a mobile, wireless communication device. The order processing and fulfillment system is constructed and configured for network-based communication with the customer remote communication device(s) and configurable to receive orders from them; a multiplicity of order fulfillment devices that are also in network-based communication with the server computer, and positioned in distributed locations, preferably at separate business entities that provide products and/or services related to the order(s), the order fulfillment devices are preferably operable in wireless communication with the server computer and configured to receive the orders from the order processing and fulfillment system server computer, and to provide confirmation of the order receipt, as well as provide a confirmation of the order fulfillment or completion, in addition to providing a printout having at least one digital representation of the order, the at least one digital representation further including at least one symbol. Furthermore, the order processing and fulfillment system server is configured to route the messages containing the orders to a selected or predetermined order fulfillment device, specified in the order or determined by the order content and/or customer indication or selection for fulfillment.

Referring now to the drawings in general, the illustrations are for the purpose of describing a preferred embodiment of the invention and are not intended to limit the invention thereto. In the figures, the printer device is generally referenced 10. In the various figures, like numerals designate the same components in different views.

The system and apparatus of the present invention and as illustrated in the figures are operable and function to perform method steps for order processing, management, and fulfillment including the steps of: receiving at an order recipient server computer, at least one message including an order that was initiated and sent from a corresponding at least one remote mobile communications devices over a communications network; the order recipient server computer transforming the order into a digital representation of the order including at least one unique symbol and transmitting the order over the network to at least one order fulfillment printer device located at an order fulfillment entity; the order fulfillment printer device receiving the order and automatically and/or autonomously transforming the order to a printed order, including the digital representation of the order having the at least one unique symbol; and the order fulfillment printer device automatically producing a printout of the order. Also, the method steps may further include the step of the order fulfillment printer device automatically generating an audible and/or visual alert when the order is received. Additionally, after completion of the order fulfillment, the at least one unique symbol is scanned by the order fulfillment printer device and an order fulfillment message is automatically generated and sent to the order recipient server via the network.

In other embodiments of the present invention, a system for order processing, management, and fulfillment is provided, including an order recipient server computer constructed and configured in electronic communication over a network with a multiplicity of remote communication customer devices and a multiplicity of order fulfillment printer devices positioned remotely; at least one message initiated and sent by the remote communication customer devices to the order recipient server computer, the at least one message including an order for product(s) and/or service(s) offered by a vendor; the order recipient server computer operable to transform the message into a digital representation of the order including at least one unique symbol, and to transmit the order over the network to the at least one order fulfillment printer device located at an order fulfillment entity for the vendor; the order fulfillment printer device operable to receive the order and automatically and/or autonomously transform the order to a printed order, including the digital representation of the order having the at least one unique symbol; and a printout of the order automatically produced by the order fulfillment printer device at the order fulfillment location. Preferably, the at least one symbol is unique to each order.

The order fulfillment printer device is operable to receive messages via wireless network-based communication, and to automatically generate an audible and/or visual alert when the order is received. Also, an order fulfillment message is automatically generated and sent to the order recipient server via the network by the order fulfillment printer device.

The present invention further provides a printer device for use in a system for order processing, management, and fulfillment including the components illustrated in the figures and described hereinbelow, and operable to receive and printout an order received by wireless messaging to the printer device.

Figure 8:
FIG. 8 is an illustration of an order printout with at least one digital representation of the order.
Figure 8:

FIG. 1 is a schematic diagram showing a front perspective view of one embodiment of the apparatus of the invention, a thermal printer device 10 having a power supply and/or power cord for connecting to power supply 12, and hardware, firmware and software that is operable for activating the device and performing the functions described herein (not shown). A scanner 14 is provided for scanning the symbol (QR code) on the order printout (FIG. 8). A light 29 may be provided along the base or sides. Functional buttons 16, 18 for selective activation of device functionality are provided on a depressed or inset surface 24 to avoid accidental selection or activation; the inset surface may further include a texture change around the buttons, but is preferably slightly inset from the main printer body to avoid accidental activation. One functional button 18 is provided for selective indication of order receipt for fulfillment by a fulfillment user or personnel. Another functional button 16 is provided to automatically call or message the sending entity, i.e., the entity that sent the order message to the fulfillment entity having the printer device on location, for providing a confirmation or other indication that the order was received at the printer device for order fulfillment processing. A hinged lid 25 (FIG. 2) or cover having a hinged opening area and a second hinged edge 20 that is equipped with a serrated edge 21 that is angled to push paper up on its way out of the device and for cutting paper for the order printout from the thermal printer device. A thermal printer roller 23 is provided for providing the thermal printing on thermal paper roll (not shown) and output from the device through an exit opening 22, and providing a slot with a curved top for paper to easily exit and to help the paper curl up on its way out; thermal printing methods are well-established in the prior art and known to one of ordinary skill. In preferred embodiments, 80 mm wide thermal paper is used, in particular, importantly, where point of sale (POS) device capability is integrated within the housing of the printer device.

The base of the printer device includes raised footings 28 positioned at spaced apart locations on the bottom of the printer device for supporting it on a horizontal surface to provide even and stable positioning during operation; alternatively the printer device may be mounted on a wall or vertical surface (not illustrated), and in one embodiment the bottom central area would include at least one hang hole (not shown) for wall mounting. A plurality of air vents or holes 26 are provided along the bottom side of the device for cooling of the internal components.

Figure 2:
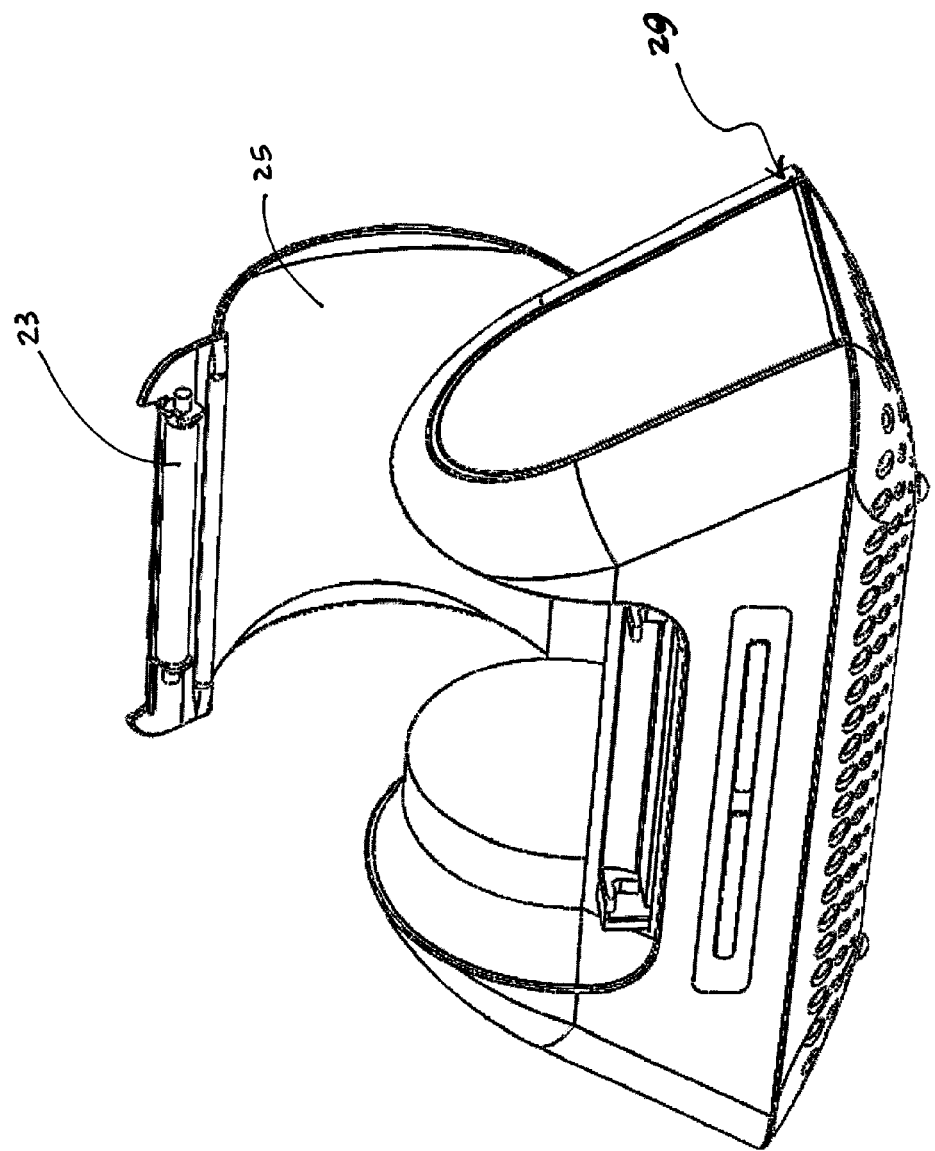
FIG. 2 is a schematic diagram showing another perspective view of the invention with top or lid open for the apparatus illustrated in FIG. 1.
Figure 3:
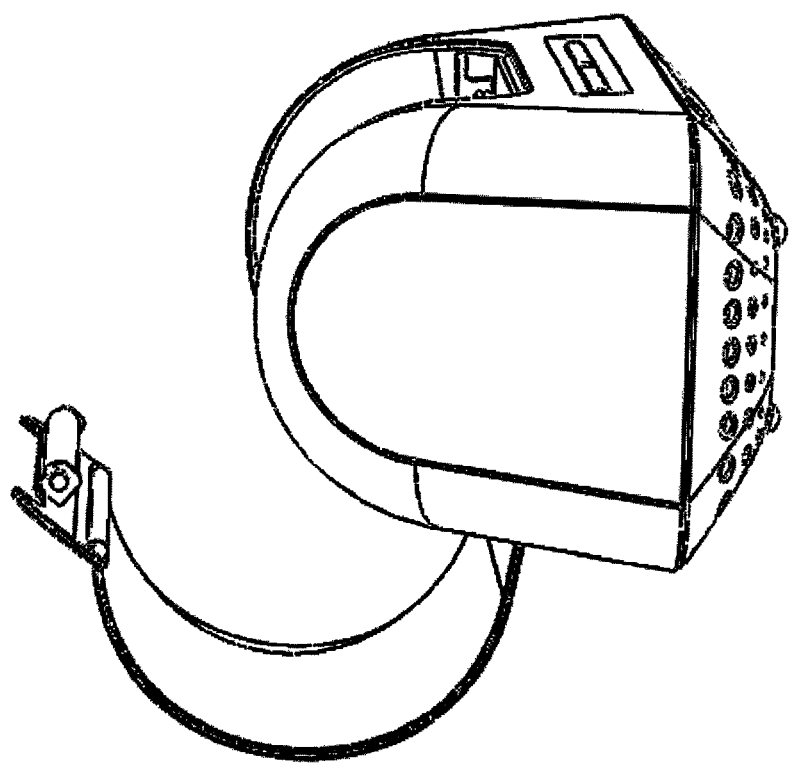
FIG. 3 is a schematic diagram showing a side perspective view of the invention with top open for the apparatus illustrated in FIG. 1.
Figure 4:
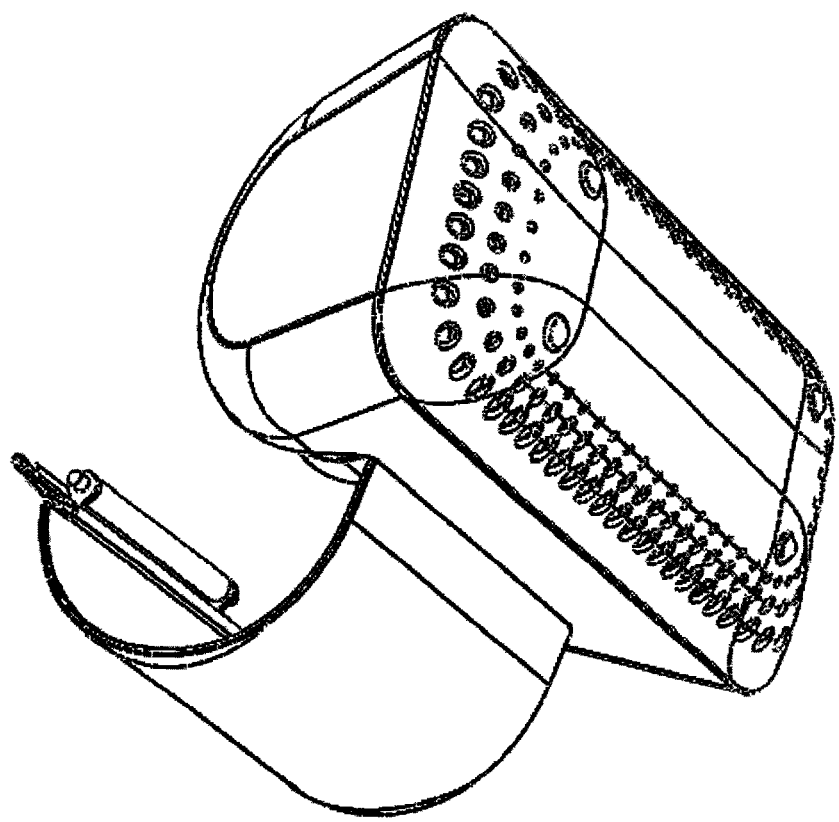
FIG. 4 is a schematic diagram showing a bottom rear perspective view of the invention with top open for the apparatus illustrated in FIG. 1.
Figure 5:
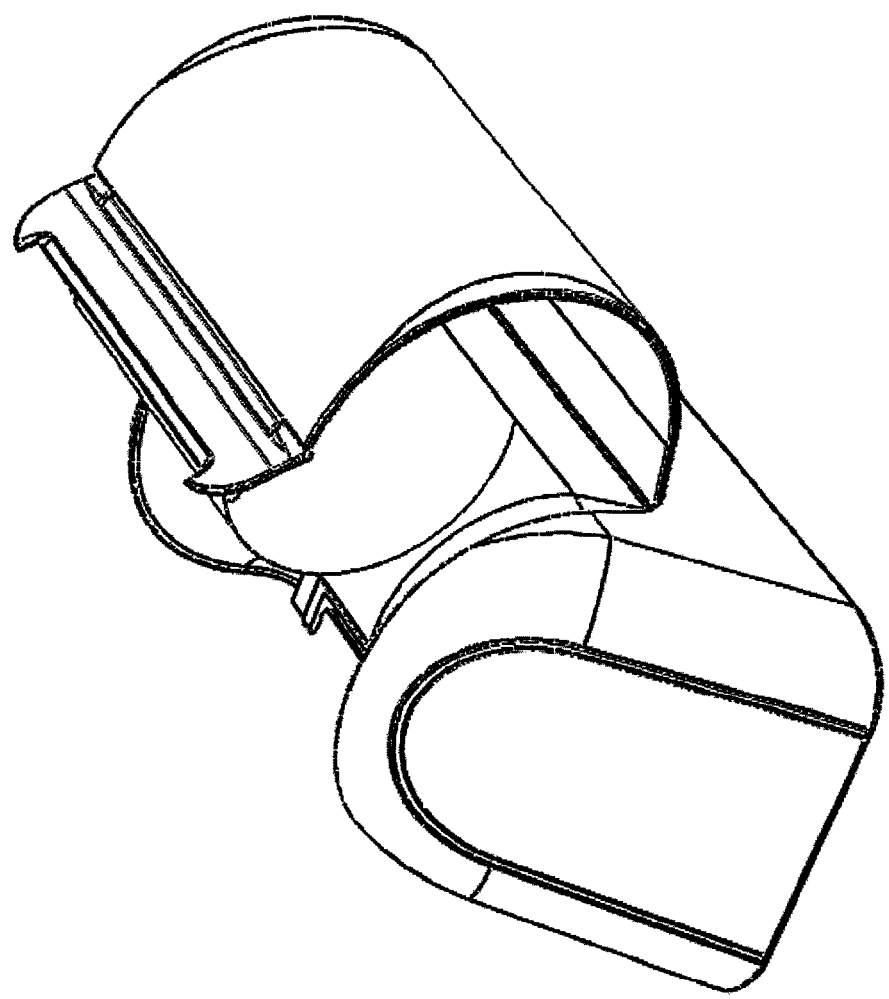
FIG. 5 is a schematic diagram showing a top side perspective view of the invention with top open for the apparatus illustrated in FIG. 1.
Figure 6:
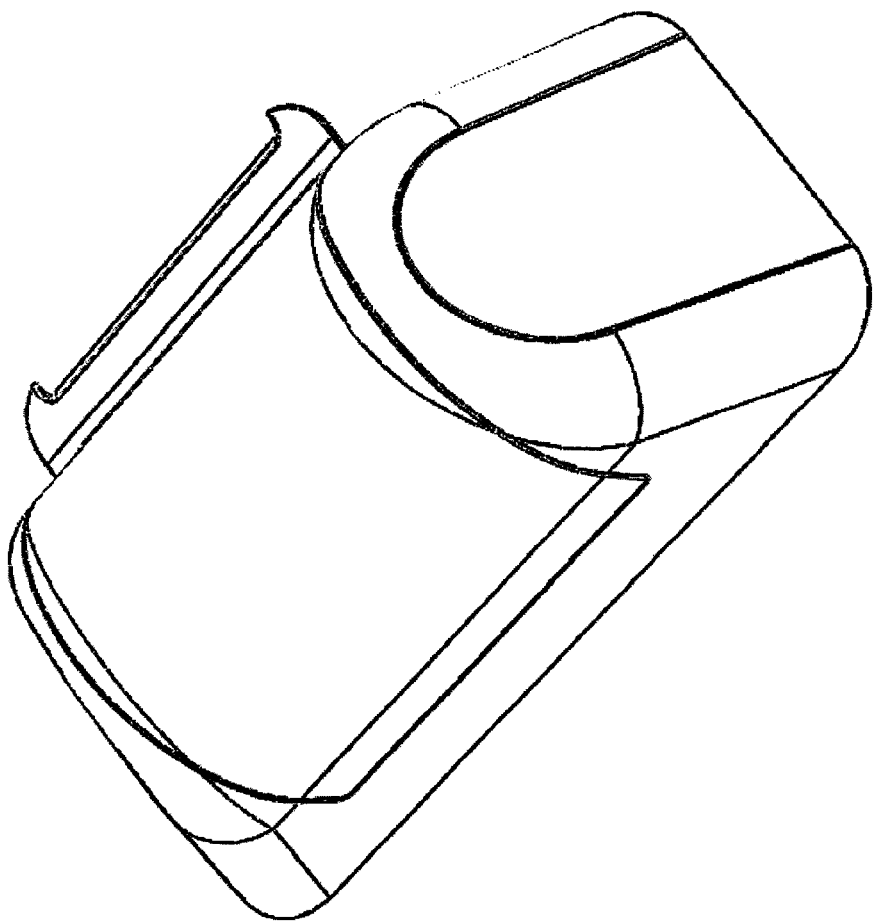
FIG. 6 is a schematic diagram showing a top perspective view of the invention for the apparatus illustrated in FIG. 1.
Figure 7:
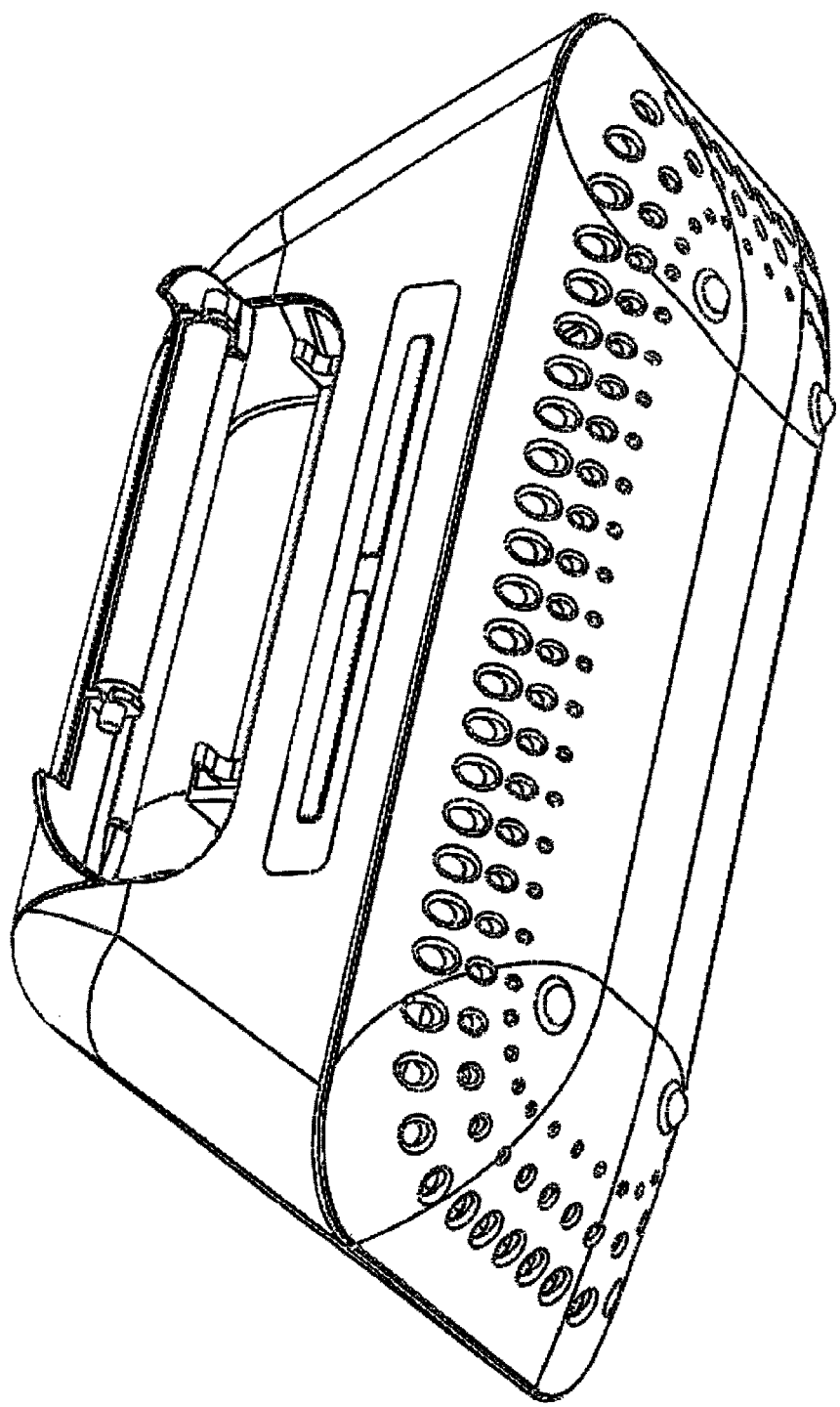
FIG. 7 is a schematic diagram showing a bottom perspective view of the invention for the apparatus illustrated in FIG. 1.

FIG. 2 is a schematic diagram showing another perspective view of the invention with top or lid open for the apparatus illustrated in FIG. 1, illustrating the printer head roller attached to the hinged door or top lid. FIG. 3 is a schematic diagram showing a side perspective view of the invention with top open for the apparatus illustrated in FIG. 1. FIG. 4 is a schematic diagram showing a bottom rear perspective view of the invention with top open for the apparatus illustrated in FIG. 1. FIG. 5 is a schematic diagram showing a top side perspective view of the invention with top open for the apparatus illustrated in FIG. 1. FIG. 6 is a schematic diagram showing a top perspective view of the invention for the apparatus illustrated in FIG. 1. FIG. 7 is a schematic diagram showing a bottom perspective view of the invention for the apparatus illustrated in FIG. 1.

FIG. 8 is an illustration of an order printout with at least one digital representation of the order. Specifically, a QR code is provided as the at least one digital representation of the order (80). Other information, including order content, price, time, date, recipient identification, order fulfillment identification (blacklined), are illustrated in addition to the QR code on the order printout for the convenience of order fulfillment personnel who may read the order printout in hardcopy format instead of digital review on a display. Alternatively, in one embodiment, the at least one digital representation of the order is provided solely by a symbol, e.g., the QR code, which corresponds to the entire order information (and the symbol is unique to each order), including but not limited to order content, price, payment information, order placement time and date, order fulfillment time and date, recipient identification, order fulfillment identification, customer identification, and combinations thereof; in this case, the order fulfillment printer device receives a message with the QR code and automatically produces a printout of the order with only the QR code visibly represented on the order printout. Importantly, the present invention provides that the symbol is unique to each order. While the printout may be scanned by a separate reader with a display (e.g., smartphone with a software application for optically scanning and displaying the text-based or alphanumeric-based order information) for use by order fulfillment personnel, the present invention best mode includes integration of optical scanning device within the housing of the thermal printer device for performing the method steps described. After completion of the order fulfillment, the QR code is scanned by the printer device and an order fulfillment message is automatically generated and sent to the order recipient server via the network.

Figure 9:
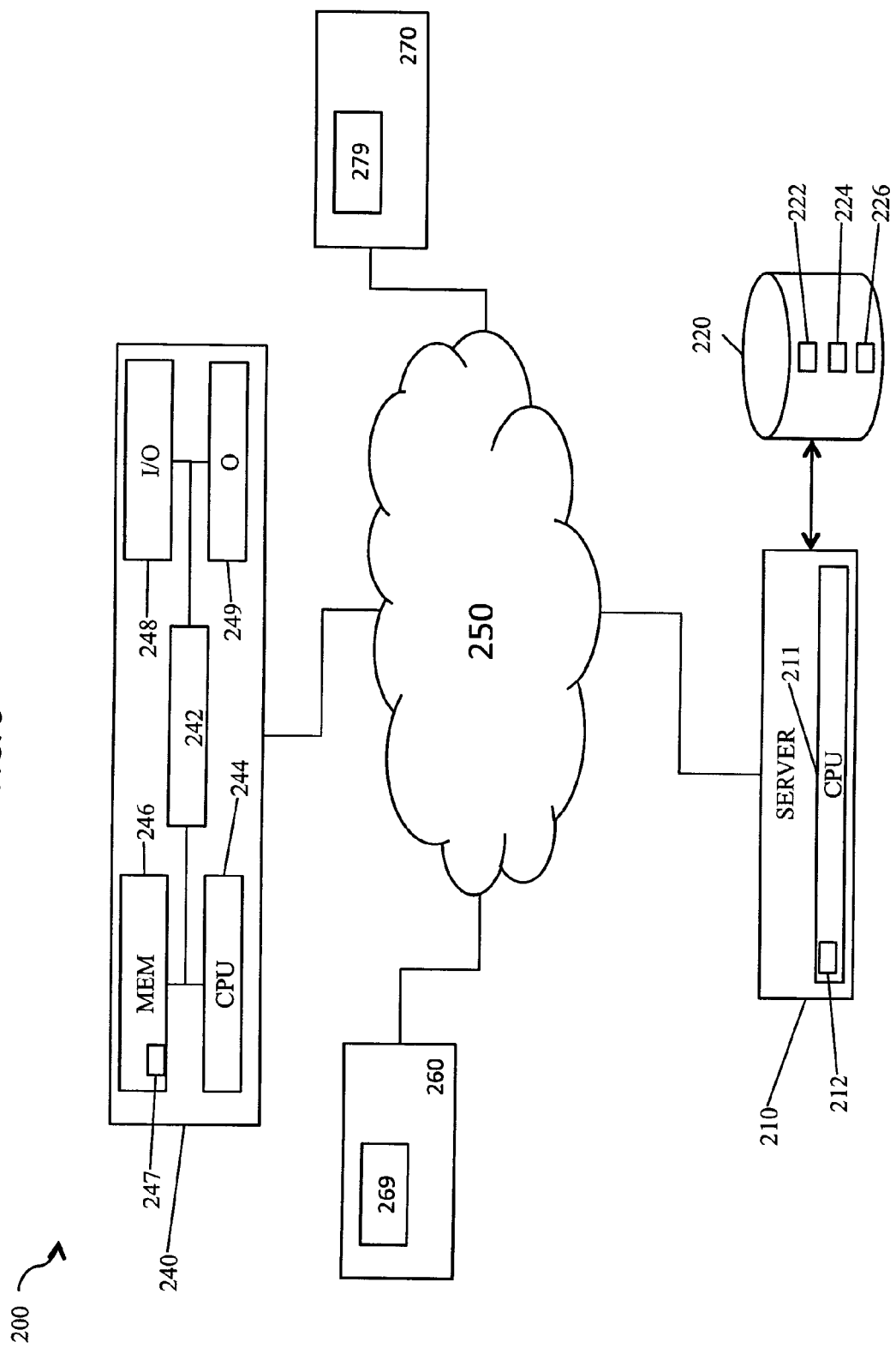
FIG. 9 is a schematic diagram illustrating a distributed system and network for communication in another embodiment of the invention.

FIG. 9 is a schematic diagram illustrating a distributed system and network for communication in another embodiment of the invention. As illustrated in FIG. 9, a basic schematic of some of the key components of a virtualized computing (or cloud-based) system including the printer device as illustrated in the other figures, according to the present invention are shown. The system 200 comprises a server 210 with a processing unit 211. The server 210 is constructed, configured and coupled to enable communication over a network 250. The server provides for user interconnection with the server over the network using a remote computer device or a personal computer (PC) 240 positioned remotely from the server. Furthermore, the system is operable for a multiplicity of remote personal computers or terminals 260, 270 for example, in a client/server architecture, or through a website and the Internet for network-based order initiation; as described hereinabove, a multiplicity of remote mobile devices for customer initiation of corresponding orders are provided, as well as a multiplicity of order fulfillment printer devices located at distributed order fulfillment locations (preferably, each order fulfillment entity has at least one printer device). Alternatively, a customer user may interconnect through the network 250 using a user device such as a personal digital assistant (PDA), mobile communication device, such as by way of example and not limitation, a mobile phone, a cell phone, smart phone, tablet computer, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices as well as the remote, distributed order fulfillment printers located at order fulfillment locations. The operating system may be any operating system known in the art that is suitable for network communication, including wired and/or wireless, specifically 3G and 4G networks and systems. The printer device preferably communicates wireless messaging as described hereinabove.

Certain modifications and improvements will occur to those skilled in the art upon a reading of the foregoing description. By way of example and not limitation, the order processing and fulfillment systems and methods of the present invention, including the order fulfillment printer device are integrated with point of sale (POS) systems for coordinating payment of the order remotely as well. Also, while physical buttons for selective activation are illustrated in the figures, virtual keys or buttons may be provided with a touch screen for selective activation. Additionally, while a thermal printer is included in examples of the preferred embodiments for generating a printout of the order, other printing equipment may also be used for printing the order, including the unique order symbol for use by fulfillment and for scanning to generate the automated order fulfillment completion message. In another example, data from the scanned order fulfillment message may be combined with order data stored at the recipient server computer (dispatch computer) and analytics may be provided for each order fulfillment entity and/or for all order fulfillment entities relating to the orders received over time, including but not limited to volume of orders per day and/or per time of day or period of time, time between order confirmation and completion of order fulfillment (based upon the time difference between the message received at the recipient server of order confirmation and the time the unique order symbol or QR code is scanned to indicate order fulfillment and that order fulfillment message is received by the recipient server, and combinations thereof; other anonymized data and analysis thereof may be stored at the server for use in marketing, planning, and process improvement with the order fulfillment entities.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for order processing, management, and fulfillment comprising the steps of:
   receiving at an order recipient server computer at least one short message service (SMS) message including an order that was initiated and sent from a corresponding at least one remote mobile communications device over a communications network;
   the order recipient server computer transforming the order into a digital representation of the order and transmitting the digital representation of the order over the communications network to at least one order fulfillment printer device located at an order fulfillment entity, wherein the digital representation of the order is provided solely by a unique quick response (QR) code and the unique QR code corresponds to the entire order information for the order, wherein the entire order information for the order includes at least a content of the order, a time of the order, an ID of the order, an ID of a customer associated with the order, a price of the order, and payment status of the order;
   the at least one order fulfillment printer device receiving the digital representation of the order and automatically transforming the digital representation of the order to a printed order;
   after completion of order fulfillment, the at least one order fulfillment printer device scanning the unique QR code to automatically obtain present order data, automatically generate an order fulfillment message, and automatically transmit the order fulfillment message to the order recipient server computer; and providing analytics for the order fulfillment entity by combining present order data with past order data stored at the order recipient server computer,
wherein the analytics include a volume of orders per a time period of a day and a time period between order confirmation and completion of order fulfillment.

2. The method of claim 1, wherein the at least one order fulfillment printer device is operable to receive messages via wireless network-based communication.

3. The method of claim 1, further including the step of the at least one order fulfillment printer device automatically generating an audible alert or a visual alert when the digital representation of the order is received.

4. The method of claim 1, further including the step of: the at least one order fulfillment printer device sending a confirmation of receipt message to the order recipient server computer via the communications network after receiving the digital representation of the order.

5. A system for order processing, management, and fulfillment comprising:
an order recipient server computer constructed and configured in electronic communication over a network with a multiplicity of remote communication customer devices and at least one order fulfillment printer device positioned remotely;
at least one short message service (SMS) message initiated and sent by at least one of the remote communication customer devices to the order recipient server computer, the at least one SMS message including an order for product(s) and/or service(s) offered by a vendor;
the order recipient server computer operable to transform the at least one SMS message into a digital representation of the order, and to transmit the digital representation of the order over the network to the at least one order fulfillment printer device located at an order fulfillment entity for the vendor, wherein the digital representation of the order is provided solely by a unique quick response (QR) code and the unique QR code corresponds to the entire order information for the order, wherein the entire order information for the order includes at least a content of the order, a time of the order, an ID of the order, an ID of a customer associated with the order, a price of the order, and payment status of the order; and
the at least one order fulfillment printer device operable to receive the digital representation of the order over a 3G communications network or a 4G communications network and automatically transform the digital representation of the order to a printed order, including the digital representation of the order having the unique QR code; and
the printed order automatically produced by the order fulfillment printer device at the order fulfillment entity for the vendor;
wherein the at least one order fulfillment printer device is operable to read the unique QR code to obtain present order data associated with the order, automatically generate an order fulfillment message, and send the order fulfillment message to the order recipient server computer via the network;
wherein the order recipient server computer is operable to provide analytics for the order fulfillment entity by combining the present order data with past order data stored at the order recipient server computer.

6. The system of claim 5, wherein the at least one order fulfillment printer device is operable to receive messages via wireless network-based communication.

7. The system of claim 5, wherein the order fulfillment printer device is operable to automatically generate an audible alert or a visual alert when the digital representation of the order is received.

8. The system of claim 5, wherein the at least one order fulfillment printer device is operable to send a confirmation of receipt message to the order recipient server computer via the network after receiving the digital representation of the order.

9. A system for order processing, management, and fulfillment comprising:
an order recipient server computer constructed and configured in electronic communication over a network with a multiplicity of remote communication customer devices and at least one order fulfillment printer device positioned remotely;
at least one message initiated and sent by at least one of the remote communication customer devices to the order recipient server computer, the at least one message including an order for product(s) and/or service(s) offered by a vendor;
the order recipient server computer operable to transform the at least one message into a digital representation of the order, and to transmit the digital representation of the order over the network to the at least one order fulfillment printer device located at an order fulfillment entity for the vendor, wherein the digital representation of the order is provided solely by a unique quick response (QR) code and the unique QR code corresponds to the entire order information for the order, wherein the entire order information for the order includes at least a content of the order, a time of the order, an ID of the order, an ID of a customer associated with the order, a price of the order, and payment status of the order;
the at least one order fulfillment printer device operable to receive the digital representation of the order and automatically transform the digital representation of the order to a printed order, including the digital representation of the order having the unique QR code;
the printed order automatically produced by the order fulfillment printer device at the order fulfillment entity for the vendor;
wherein the at least one order fulfillment printer device is operable to read the unique QR code to obtain present order data associated with the order, automatically generate an order fulfillment message, and send the order fulfillment message to the order recipient server computer via the network;
wherein the at least one order fulfillment printer device is operable to receive messages via wireless network-based communication; and
wherein the at least one order fulfillment printer device is operable to automatically transform the digital representation of the order into a printed order by automatically producing a printout of the digital representation of the order.

10. The system of claim 9, wherein the order fulfillment printer device is operable to automatically generate an audible alert or a visual alert when the digital representation of the order is received.

* * * * *